(12) United States Patent
Ramrakhyani et al.

(10) Patent No.: US 8,486,324 B2
(45) Date of Patent: Jul. 16, 2013

(54) METHOD AND APPARATUS FOR PRODUCING TIERED CONTAINERS

(75) Inventors: Arjun Ramrakhyani, Glenview, IL (US); Steve Karnatz, Wauconda, IL (US)

(73) Assignee: Automatic Liquid Packaging Solutions LLC, Arlington Heights, IL (US)

( * ) Notice: Subject to any disclaimer, the term of this patent is extended or adjusted under 35 U.S.C. 154(b) by 95 days.

(21) Appl. No.: 12/804,527

(22) Filed: Jul. 23, 2010

(65) Prior Publication Data

US 2012/0018928 A1    Jan. 26, 2012

(51) Int. Cl.
*B29C 49/04* (2006.01)
(52) U.S. Cl.
USPC ............................. 264/525; 264/523; 264/524
(58) Field of Classification Search
USPC .......................................... 264/523, 524, 525
See application file for complete search history.

(56) References Cited

U.S. PATENT DOCUMENTS

| | | | |
|---|---|---|---|
| 3,399,508 A * | 9/1968 | Frielingsdorf et al. | ......... 53/140 |
| 3,872,202 A | 3/1975 | Lafosse | |
| 4,699,748 A | 10/1987 | Weiler | |
| 4,901,873 A | 2/1990 | Weiler | |
| 4,967,539 A * | 11/1990 | Hansen | ........................... 53/453 |
| D369,211 S | 4/1996 | Weiler | |
| 5,503,885 A | 4/1996 | Anderson | |
| 5,878,900 A | 3/1999 | Hansen | |
| 6,381,926 B1 | 5/2002 | Weiler et al. | |
| 6,669,461 B1 * | 12/2003 | Taylor et al. | .................. 425/537 |
| 7,396,225 B2 | 7/2008 | Hansen | |
| 2009/0250848 A1 * | 10/2009 | Gupta | ........................... 264/540 |

FOREIGN PATENT DOCUMENTS

DE    2 134 166    1/1973

* cited by examiner

*Primary Examiner* — Galen Hauth
(74) *Attorney, Agent, or Firm* — Pauley Petersen & Erickson

(57) ABSTRACT

A method and apparatus for molding a plurality of tiered containers from a single parison. Two or more parisons can be arranged next to each other. A molding apparatus of this invention can have one or more mold sections that can be operated in a controlled fashion to form a stacked or tiered arrangement of containers from a single parison or can be arranged to form an array of containers including two or more columns of containers each having two or more tiered containers, all during a single cycle of the molding apparatus. Each container formed by the method and apparatus of this invention can be blow molded and/or vacuum formed and/or filled and/or sealed. Each seal can be a hermetic seal or any other suitable seal formed through a molding step.

25 Claims, 14 Drawing Sheets

METHOD AND APPARATUS FOR PRODUCING TIERED CONTAINERS

BACKGROUND OF THE INVENTION

1. Field of the Invention

This invention relates to a method and apparatus for forming a plurality of tiered containers, including an array or matrix of containers, where each container can be blow molded and/or vacuum formed, filled and/or sealed.

2. Discussion of Related Art

Many different molding apparatuses and methods can be used to form multiple containers during one molding cycle. For example, blow molding methods are known to form one or more containers along only one card or horizontal row of containers, for each of a plurality of parisons. Thus, during one molding cycle, known blow molding apparatuses can produce multiple containers by having multiple parisons positioned next to each other, each with one or more horizontally positioned containers.

Moving devices are known for operating different molds and other elements of molding apparatuses. Different container shapes, sizes and designs are also known in the molding industry. Filling, sealing, flushing with media and/or fluid, cutting and other devices and apparatuses for moving and/or operating elements of blow molding machines are known to those skilled in the art of blow molding.

Conventional blow molding devices use sections of mold halves to form a body for a container. Holding jaws may also be used to position a parison between the molding halves. Molding halves are then closed about the parison to form a container.

In conventional blow molding devices, a blowing nozzle extends through an opening of the parison. Gas is blown through the nozzle, into the parison to mold the body of the container. A filling tube contained in the nozzle can also be used to fill the formed container with a material. After the nozzle is retracted, the filled container can be sealed. Sealing devices are also known for providing a seal, such as a hermetic seal on a container.

In many conventional molding devices, only one horizontal row of containers is formed during one molding cycle of the molding device. In conventional molding devices, for each molding cycle in which mold halves are closed together, only one horizontal row of containers is formed.

SUMMARY OF THE INVENTION

A molding apparatus according to this invention can be used to form an array of columns by rows of tiered or stacked containers in each of one or more parisons. Different mold sections of one integrated mold can be operated to form at least one column of two or more tiered or stacked containers within each of one or more parisons. Some embodiments of this invention use a tiered or stacked arrangement of a plurality of containers within each of a plurality of parisons positioned or arranged next to each other.

For example, an array or matrix of containers can be formed by simultaneously molding six individual parisons positioned next to each other, with each parison used to form four tiered or stacked containers, to thereby provide an array of twenty-four containers. As another example, an array or matrix of containers can be formed by molding ten individual parisons positioned next to each other, with each parison used to form twelve containers, four columns by three rows, so that each of ten parisons forms twelve containers and the overall array or matrix of containers formed by the ten parisons has a total of 120 containers.

The array or matrix of containers can be designed or structured to form any suitable number of containers. In other embodiments of this invention, some parisons are used to form a different number of containers than other parisons within the same molding cycle. For example, using six parisons it is possible to provide an array of twenty containers, for example if four parisons each have four tiered containers and the remaining two parisons each have two tiered containers. Any arrangement of containers within the rows and columns of an array can be accomplished with the apparatus and method according to this invention.

In other embodiments according to this invention, the molding apparatus can be used to mold one parison with two or more tiered or stacked containers. Each of several parisons can have a stacked or tiered arrangement of containers, so that multiple containers can be formed from multiple tiers and multiple parisons during one molding cycle.

By molding or forming a plurality of containers in a tiered or stacked arrangement according to this invention, it is possible to significantly reduce the footprint and thus the size of conventional molding machines and their components. For producing a given number of containers, the tiered or stacked arrangement of containers within an array of rows by at least one column, according to this invention, significantly reduces the necessary footprint of a molding machine. A molding machine according to this invention, which can produce two times, three times, four times and many more times as many containers as a conventional molding machine that produces only one horizontal row of containers, is not much larger than a conventional molding machine that can produce only one horizontal row of containers.

For example, with a simple three tiered arrangement of containers according to this invention, it is only necessary to move a molding machine carriage back and forth through an operating cycle one time verses the three times that would otherwise be necessary with a conventional molding machine that can produce only one horizontal row of containers.

The reduced footprint of the molding machines according to this invention can result in significant energy savings and savings of operating costs due to a reduced amount of operations and/or maintenance for the molding machines. By manufacturing containers within an array of rows by at least one column, according to this invention, it is possible to significantly reduce an amount of required resin because the amount of scrap material associated with comparable conventional molding or blow molding machines is reduced, such as by forming an array of containers in two or more rows of tiered or stacked containers.

It is apparent that there is a need for a method and apparatus for molding tiered containers in an array of rows by at least one column, particularly in one molding cycle.

BRIEF DESCRIPTION OF THE DRAWINGS

This invention is explained in greater detail below in view of exemplary embodiments shown in the drawings, wherein.

DETAILED DESCRIPTION OF THE INVENTION

Many structures or apparatuses and the methods or processes for producing structures or apparatuses are known to those skilled in the art of manufacturing molded containers, including hermetically sealed and/or filled containers, such as by blow molding and/or vacuum forming, or by another suitable molding process or method. For example, U.S. Pat. No. 6,381,926, U.S. Pat. No. 4,967,539, U.S. Pat. No. 7,396,225, U.S. Pat. No. 5,503,885 and U.S. Pat. No. 4,699,748 each teaches known technologies associated with structures and methods for producing containers, including filled and/or hermetically sealed containers, and the entire teachings of each is incorporated into this specification by reference to U.S. Pat. No. 6,381,926, U.S. Pat. No. 4,967,539, U.S. Pat. No. 7,396,225, U.S. Pat. No. 5,503,885 and U.S. Pat. No. 4,699,748. Some of the features of this invention are similar to corresponding features taught by these United States patents, and features taught by these United States patents are integrated with and made a part of this specification and disclosure.

While this invention is susceptible to embodiments in many different forms, the drawings show and this specification describes in detail, some embodiments of this invention with the understanding that this disclosure is considered to exemplify the principles of this invention and is not intended to limit the broad aspect of this invention to those embodiments shown, described and/or claimed.

Figure 1:
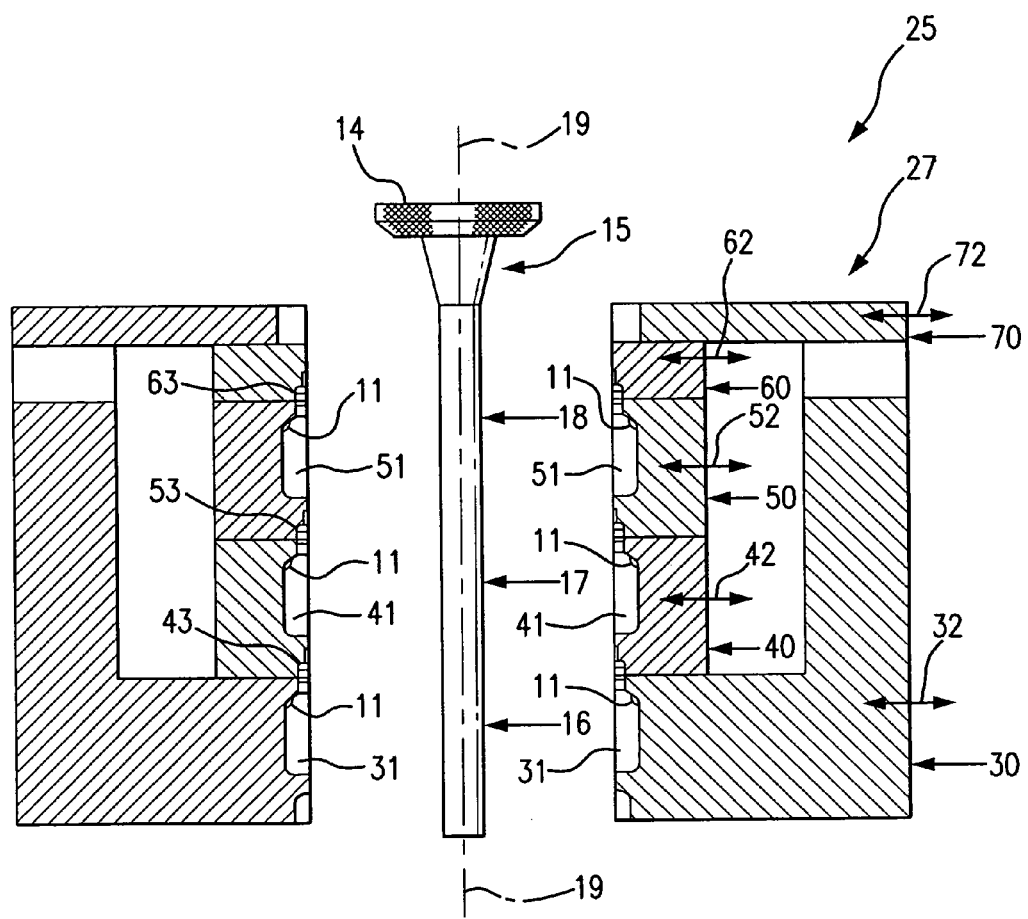
FIG. 1 is a cross-sectional view of a molding apparatus, showing one initial or preliminary step of a method for molding a plurality of tiered containers from one parison, according to one embodiment of this invention.

FIG. 1 shows a cross-sectional view of mold 27 at an initial step of a method for molding a plurality of tiered containers from one parison 15. In any suitable manner known to those skilled in the art of molding or form/fill/seal technology, parison 15 is extruded through head 14, which can include any suitable extruder head or other parison forming device. Parison 15 is positioned between corresponding mold halves of mold 27, so that as the respective mold halves move towards each other, corresponding mold halves close with respect to each other, such as about or around parison 15, and form one or more containers between the mold halves. Parison 15 is then cut, severed or otherwise detached, at or below head 14.

Figure 16:
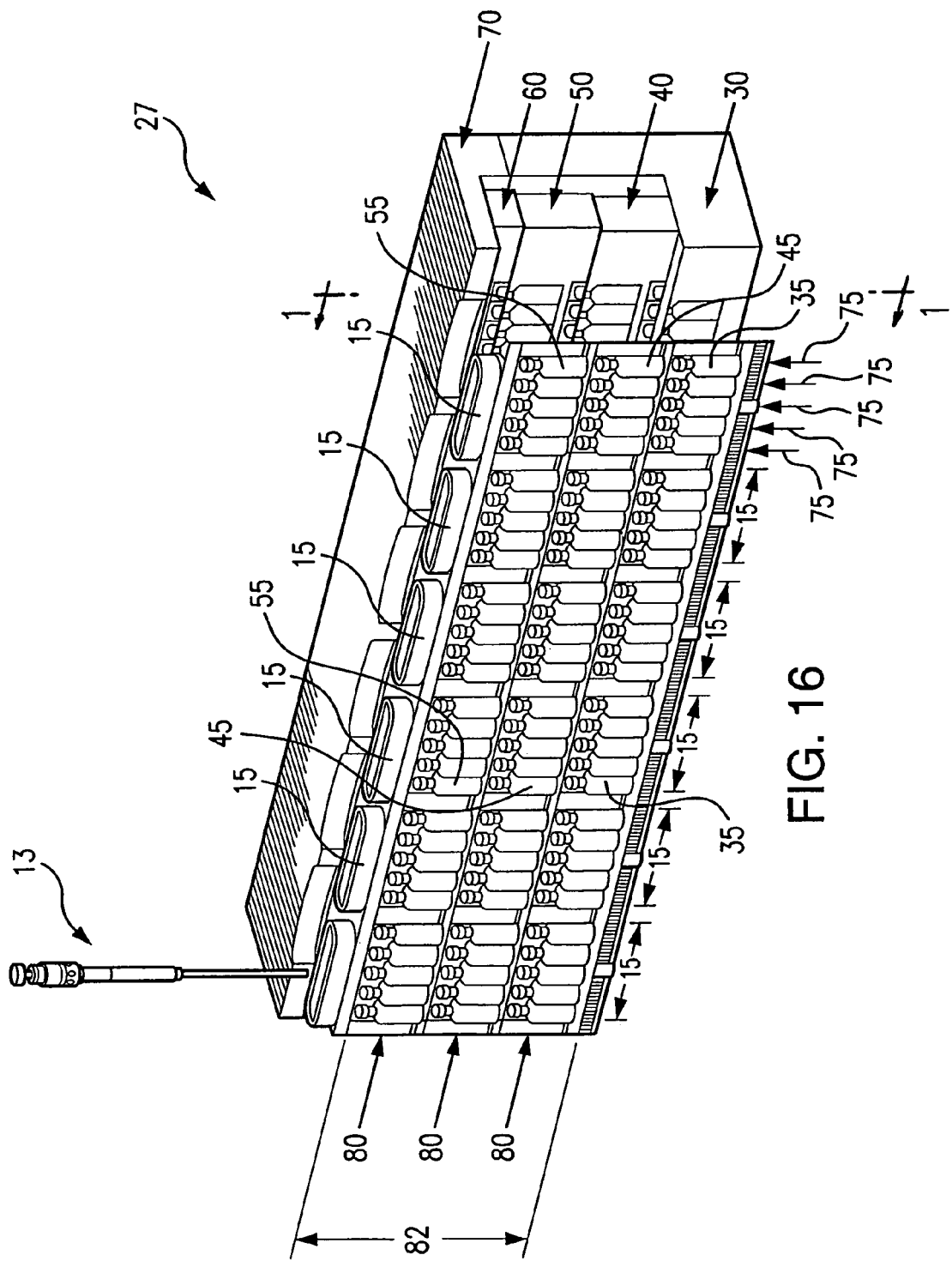
FIG. 16 shows a perspective view of three tiers of one of two mold halves of a mold that accommodates six individual parisons, wherein each parison has an array or matrix of fifteen containers formed by three rows of containers each having five columns of containers, according to one embodiment of this invention.

Each of FIGS. 1, 1A, 1B, 1C and 1D shows a cross-sectional view taken in a direction along line 1-1, such as shown in FIG. 16 of mold 27. The two-dimensional view of FIG. 1 shows only one parison 15 but multiple parisons 15 can be arranged in a third direction perpendicular to a plane formed by the two-dimensional drawing of FIG. 1. Thus, when considered in view of the embodiment shown in FIG. 16, parison 15 as shown in FIG. 1 actually represents six different parisons 15 aligned in the third direction of FIG. 1, perpendicular to the plane of the drawing. As shown in FIG. 1, axis 19 follows a general longitudinal direction of parison 15. However, because the specific shape of parison 15 may not have the shape shown in FIG. 1 or may not have a precise or consistent shape, axis 19 can be positioned at a different orientation than that as shown in FIG. 1, for example.

As shown in FIG. 1, each of movers 32, 42, 52 and 62 moves a corresponding first section 30, second section 40, third section 50, and fourth section 60, respectively, in a direction which is non-parallel to or generally perpendicular to axis 19. However, because axis 19 can have a slightly different position, depending upon the particular shape of parison 15, mover 32, 42, 52 and/or 62 can move in a direction non-parallel to but slightly different than precisely perpendicular to axis 19 and still accomplish the same result of positioning corresponding mold halves about or around first portion 16, second portion 17 and/or third portion 18 of parison 15.

Figure 18:
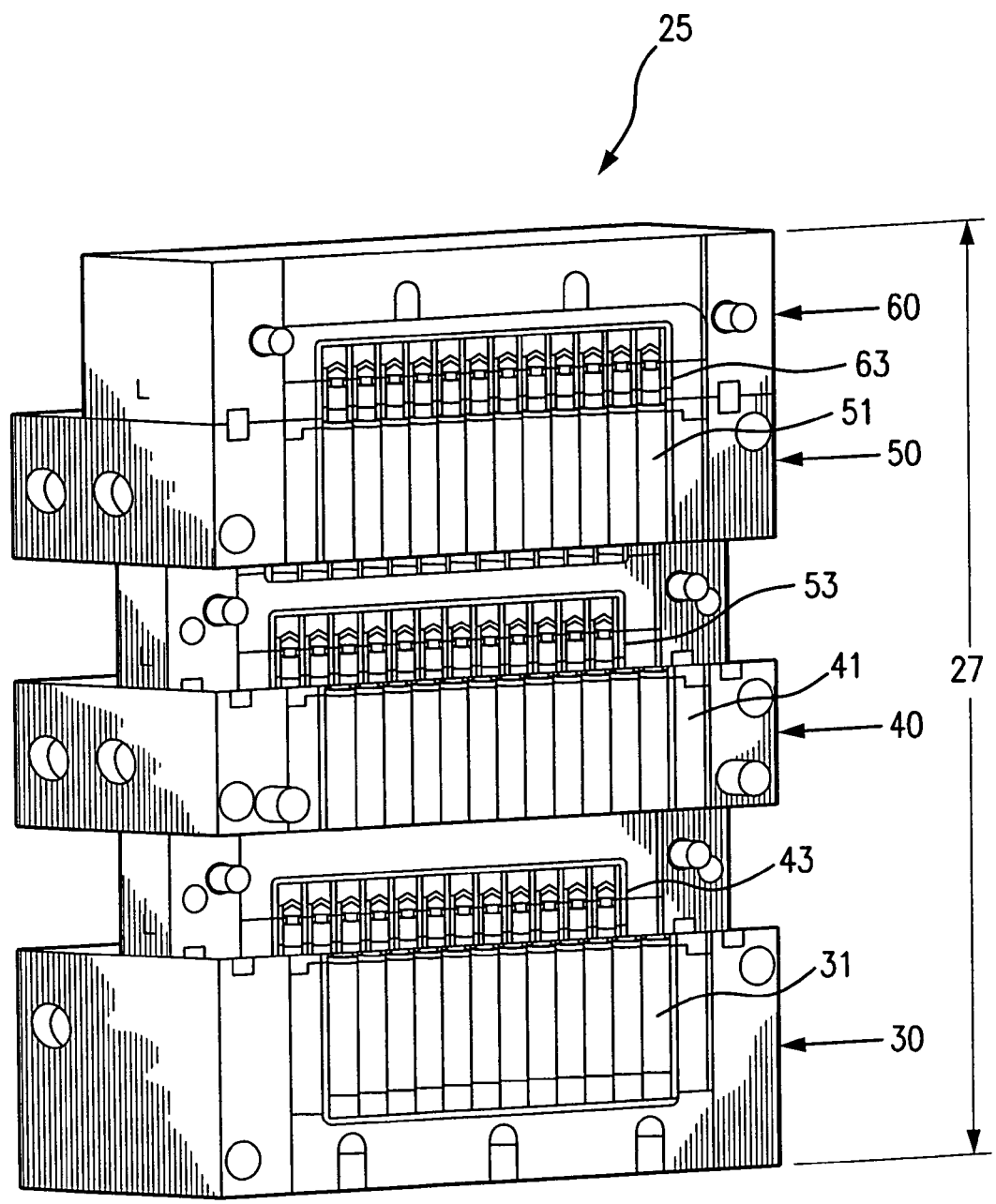
FIG. 18 shows a perspective view of a molding apparatus, according to one embodiment of this invention.

Each of FIGS. 1, 1A, 1B, 1C and 1D shows two opposing mold halves which each have a plurality of sections and/or subsections, such a first section 30, second section 40 and third section 50. However, for clarification, each of FIGS. 16 and 18 shows only one of the two mold halves of mold 27.

In the embodiment shown in FIG. 1, parison 15 can be apportioned or configured into first portion 16, second portion 17 and third portion 18, which are tiered or stacked generally along axis 19 of parison 15. When the mold halves of mold 27 close with respect to each other, first section 30 of mold 27 closes about or around first portion 16 of parison 15. As shown in FIG. 1, second section 40 of mold 27 is positioned or arranged to close about or around second portion 17 of parison 15. In a similar fashion, third section 50 of mold 27 is positioned or arranged to close about or around third portion 18 of parison 15. In other embodiments according to this invention, mold 27 can have two mold sections forming only two tiered containers, for example first container 35 and second container 45, on a single parison 15. In still other embodiments according to this invention, mold 27 can have four or more mold sections of one mold 27 that correspondingly form four or more tiered containers on a single parison 15.

In some embodiments according to this invention, each container is blow molded and/or vacuum formed, so that each container is only formed and not filled and/or sealed. In other embodiments according to this invention, each container is blow molded and/or vacuum formed and then filled but not sealed. In still other embodiments according to this invention, each container is blow molded and/or vacuum formed, filled and then sealed. As used throughout this specification and in the claims, the terms form, formed, and forming are intended to be interchangeable with each other and to relate to a method step or a device used to transform or convert a parison into a container.

In some embodiments according to this invention in which the containers are blow molded, a conventional blowing nozzle can be used to blow form each container against a mold wall of cavity 31 of first container 35, a mold wall of cavity 41 of second container 45 and/or a mold wall of cavity 51 of third container 55. In other embodiments according to this invention, parison 15 is vacuum formed by using a vacuum source to draw parison 15 against a corresponding mold wall of cavity 31, 41 and/or 51. FIG. 1 shows each mold half of each of first section 30, second section 40 and third section 50 having vacuum supply 11, which for example can be a void formed in first section 30, second section 40 and/or third section 50, in communication with cavity 31, 41 and/or 51. Any other suitable vacuum channel or void or other fluid transfer device can be used for communication between a vacuum source and cavity 31, 41 and/or 51.

As shown in FIG. 1, according to one embodiment of this invention, holder 70 is positioned away from but can be operated or moved to close about or around parison 15 and hold parison 15. Holder 70 may comprise holding jaws, holding halves and/or any other suitable holding structure for using a vacuum source or supply to hold parison 15 with respect to mold 27. Mover 72 may be used to operate, open and/or close holder 70. In some embodiments according to this invention, parison 15 is cut, such as shown in FIG. 1A, to form an open end or another suitable opening or void that can accept a nozzle or other device for blowing, filling and/or sealing.

Any suitable mover can be used to open and/or close or otherwise operate mold halves of each of first section 30, second section 40, third section 50, fourth section 60 and/or holder 70. In some embodiments according to this invention, such as shown in FIGS. 1 and 1A, first section 30 operates or moves with respect to first portion 16 of parison 15 to form first container 35. Then, second section 40 operates or moves about or around second portion 17 of parison 15 to form second container 45. Then, third section 50 operates or moves with respect to third portion 18 of parison 15 to form third container 55. In many embodiments according to this invention, third section 50 operates or moves after second section 40 operates or moves, which occurs after section 30 operates or moves. In other embodiments according to this invention, it is possible for second section 40 to move simultaneously with first section 30 and/or third section 50.

Figure 1A:
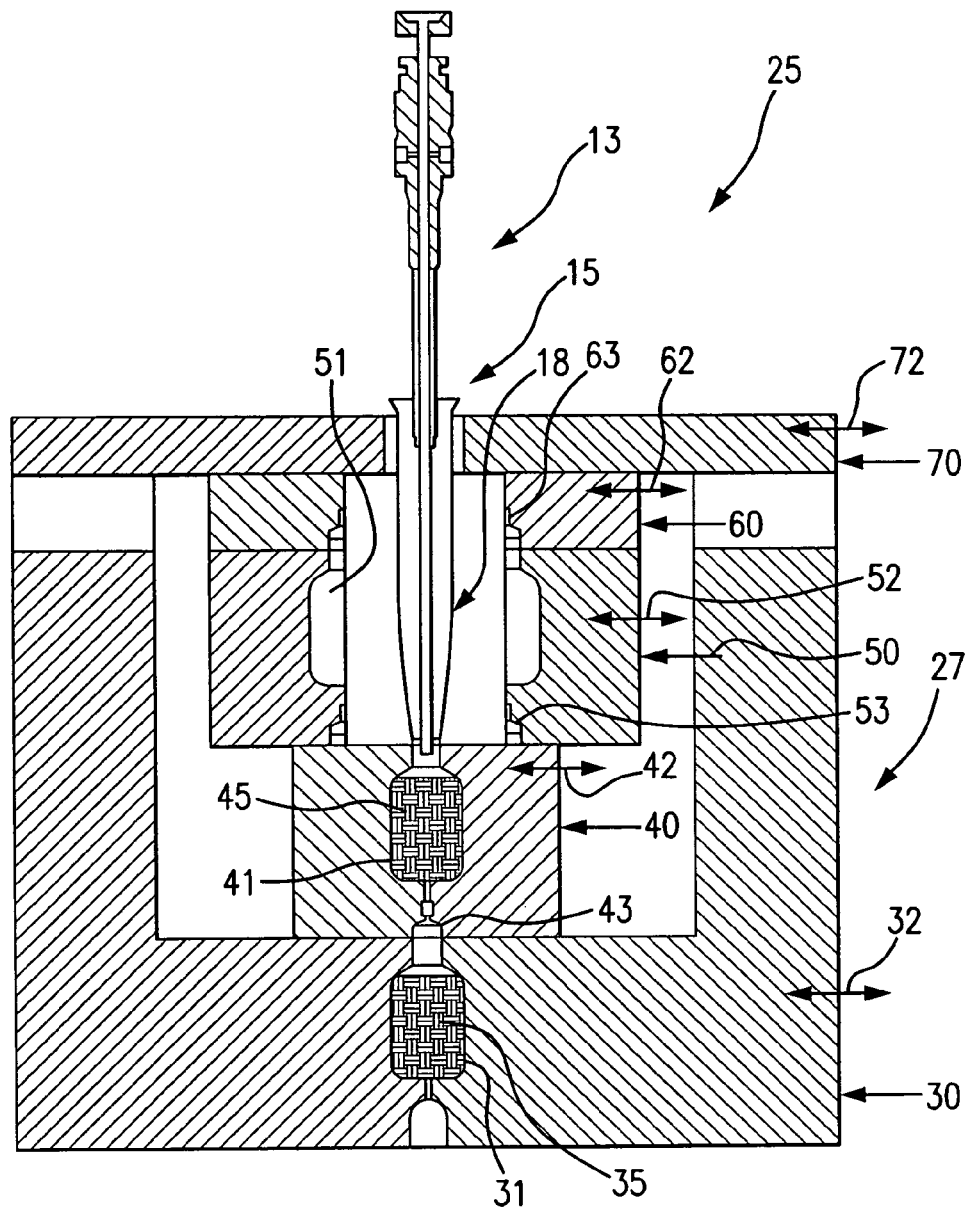
FIG. 1A is a cross-sectional view of a molding apparatus, showing one step of a method for molding and filling a plurality of tiered containers from one parison, according to another embodiment of this invention.
Figure 5:
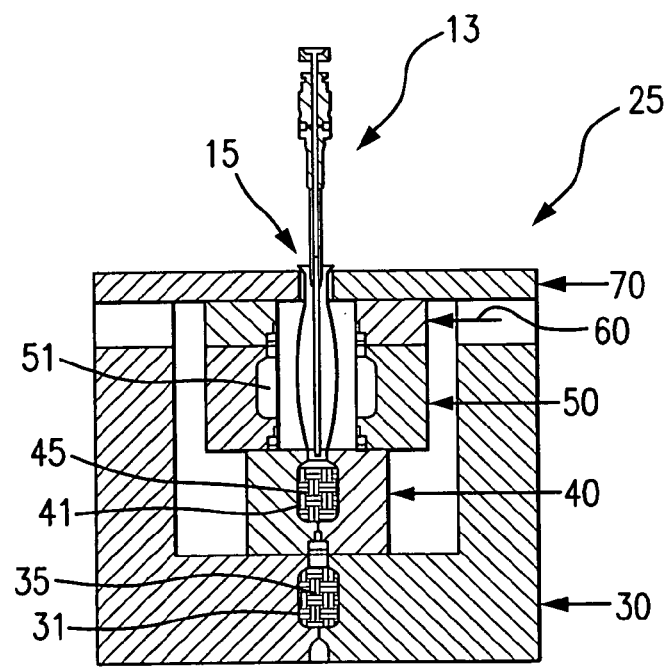

FIG. 1A shows a cross-sectional view of mold 27 at an intermediate step of a method for molding a plurality of tiered or stacked containers from one or more parisons 15, according to one embodiment of this invention. As shown in the method step of FIG. 1A, a single parison 15 is formed into two tiered or stacked containers 35 and 45 while a third tiered or stacked container 55 is about to be formed by operating or moving third section 50 of mold 27, one result of which is shown in FIG. 5.

Figure 1B:
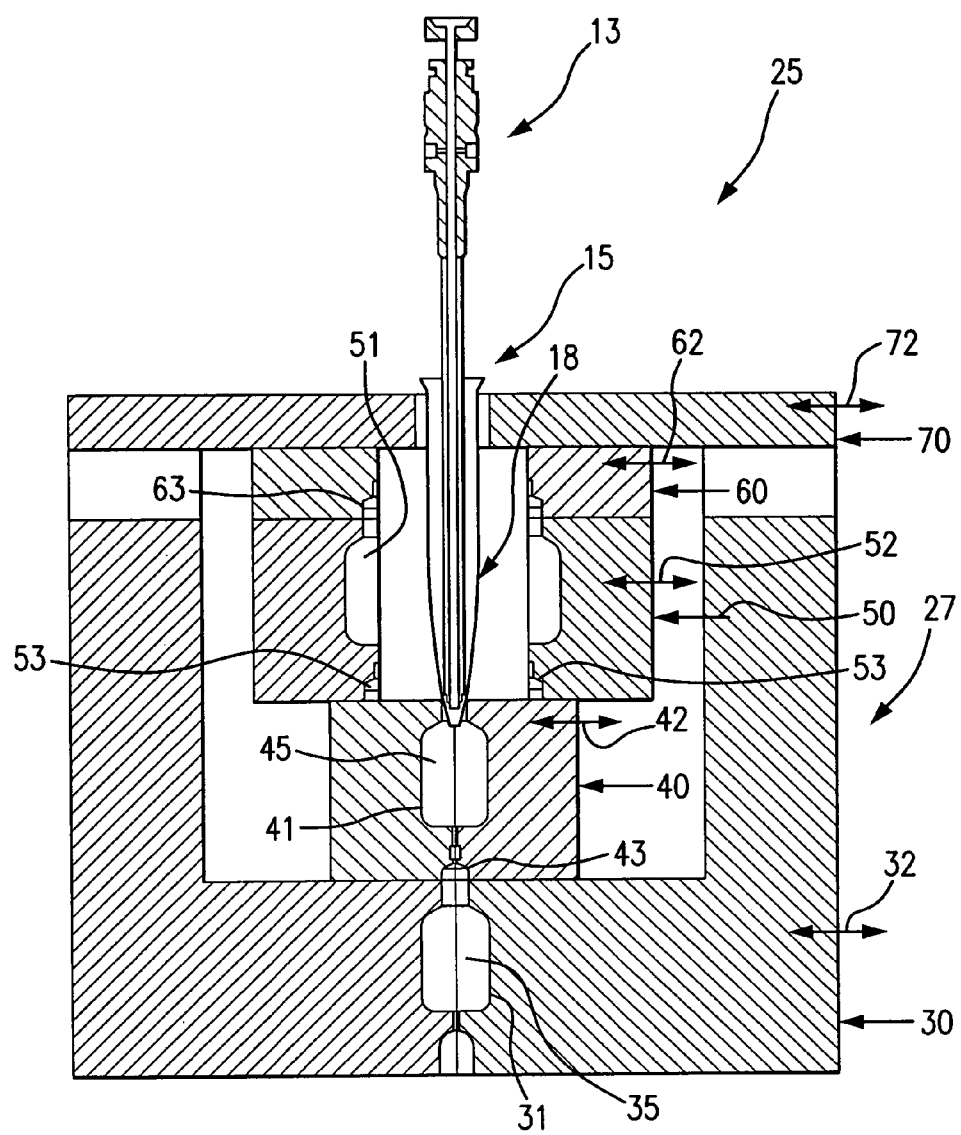
FIG. 1B is a cross-sectional view of a molding apparatus, showing one step of a method for molding a plurality of tiered containers from one parison, according to another embodiment of this invention.
Figure 4:
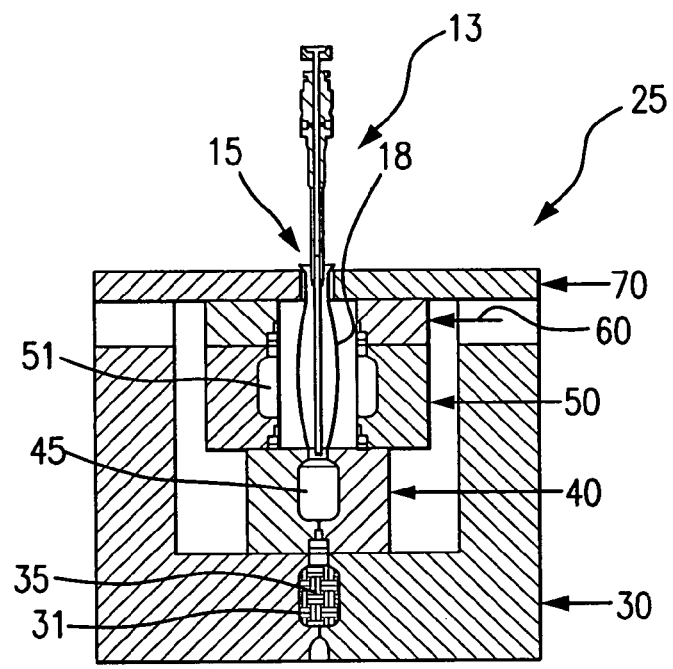

FIG. 1B shows a cross-sectional view of mold 27 in an intermediate step of a method for molding a plurality of tiered or stacked containers from one or more parisons 15, according to other embodiments of this invention. As shown in FIGS. 1B and 1D, first container 35 is unfilled or empty. In other embodiments according to this invention, such as shown in FIGS. 1A, 1C and 4, at a similar step, container 35 is filled and sealed.

Figure 1C:
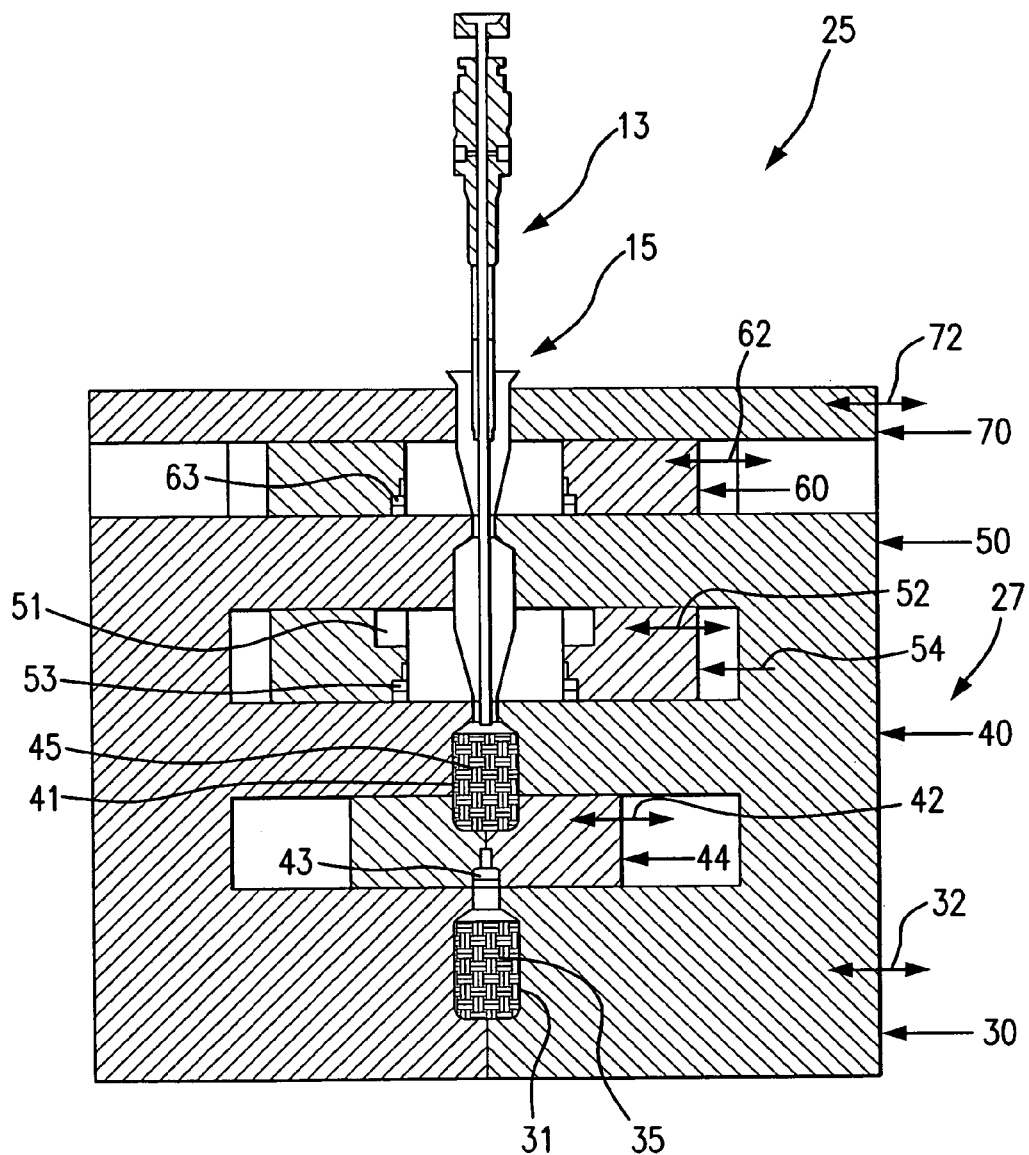
FIG. 1C is a cross-sectional view of a molding apparatus, showing one step of a method for molding, for example by vacuum forming, a plurality of tiered containers from one parison, according to another embodiment of this invention.
Figure 1D:
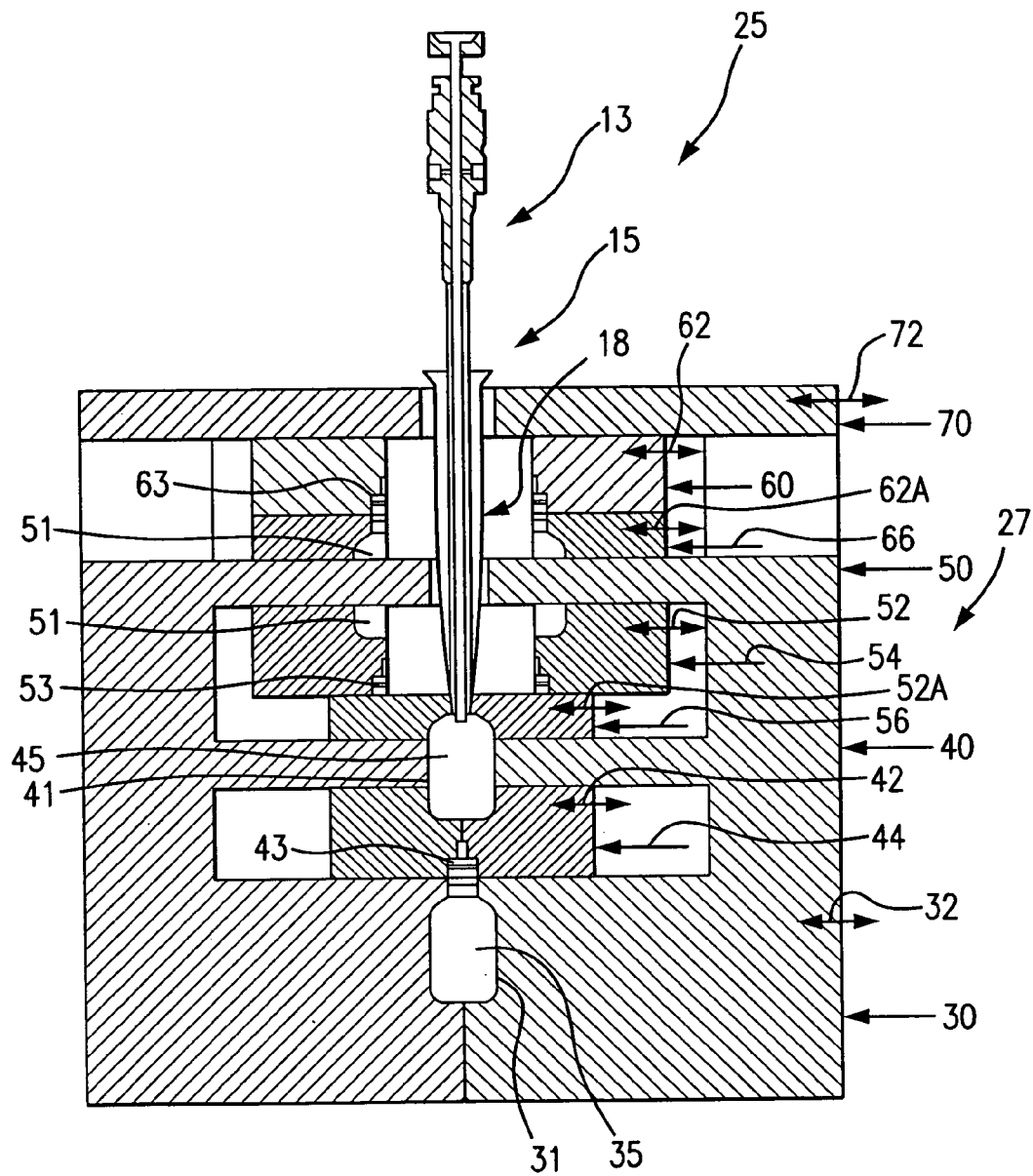
FIG. 1D is a cross-sectional view of a molding apparatus, showing one step of a method for molding, for example by blow molding, a plurality of tiered containers from one parison, according to still another embodiment of this invention.

FIG. 1C shows a cross-sectional view of mold 27 at an intermediate step of a method for molding a plurality of tiered or stacked containers from one or more parisons 15, according to another embodiment of this invention. The method step shown in FIG. 1C is similar to the method step shown in FIG. 1A, in which at least one container is blow molded and/or vacuum formed, filled and sealed. The method step shown in FIG. 1C also differs from the method step shown in FIG. 1A, because at least a portion of each of first section 30, second section 40 and third section 50 is integrated to form a unitary mold structure or mold half With the integrated mold arrangement, such as shown in FIG. 1C, it is possible to form at least a portion of each of first container 35, second container 45 and third container 55 in one closing motion of an integrated mold 27. As shown in FIG. 1C, each of first container 35, second container 45 and third container 55 is partially formed as mover 32 operates to close the mold halves and simultaneously form the three portions. Then, mover 42 operates sealer 43 and subsection 44, which is a portion or subpart of second section 40, and operates or closes to both seal first container 35 and also simultaneously form a lower portion of second container 45. Also, as shown in FIG. 1C, mover 52 operates to open or close subsection 54 to both seal second container 45 and also simultaneously form a lower portion of third container 55. Any other arrangement of subsections or subparts or portions of first section 30, second section 40, third section 50 and/or any other similar section can be assembled to form an integrated mold 27 that can perform many different mold steps and/or operations.

FIG. 1D shows a cross-sectional view of mold 27 having a configuration or assembly of subsections arranged different than the arrangement of FIG. 1C, for example, at an intermediate step of a method for molding a plurality of tiered or stacked containers from one or more parisons 15, according to still other embodiments of this invention. FIG. 1D also shows first section 30 integrated with at least a portion of second section 40 and at least a portion of third section 50. The portions of second section 40 and third section 50 as shown in FIG. 1D are smaller than the portion of second section 40 and third section 50 which are integrated as shown in FIG. 1C. Subsection 44 of FIG. 1D is similar to subsection 44 of FIG. 1C. However, FIG. 1D differs from the integrated mold 27 of FIG. 1C because the integrated mold 27 of FIG. 1D also comprises subsection 56, which can be operated by mover 52A. As shown in FIG. 1D, subsection 56 can be operated to form an upper portion of second container 45. As shown in FIG. 1D, subsection 54 can be operated by mover 52 to both seal second container 45 and also simultaneously form a lower portion of third container 55. FIG. 1D also differs from the integrated mold 27 of FIG. 1C because subsection 66 can be operated by mover 62A to form an upper portion of third container 55. Mover 62 can then be operated to close fourth section 60 and seal third container 55, for example with sealer 63.

Any one or more of mover 32, 42, 52, 62 and/or 72 can be modified or designed to close, open or otherwise operate any section and/or subsection of mold 27, according to this invention.

In many embodiments according to this invention, such as those shown in FIGS. 1 and 1A-1D, mold 27 comprises mold halves operating together as an integrated mold or a unitary mold formed by integrating different sections, such as first section 30, second section 40 and/or third section 50 and/or any subsections or portions of those sections. As used throughout this specification and in the claims, the term integrated or the term integrated mold are intended to be interchangeable with each other and to relate to a mold, such as mold 27, having individually and/or collectively controllable sections, subsections, subparts and/or portions that are combined or integrated with each other to form an overall unitary mold or mold structure that can be used to mold two or more tiered or stacked containers, according to the method and/or the apparatus of this invention.

Figure 2:
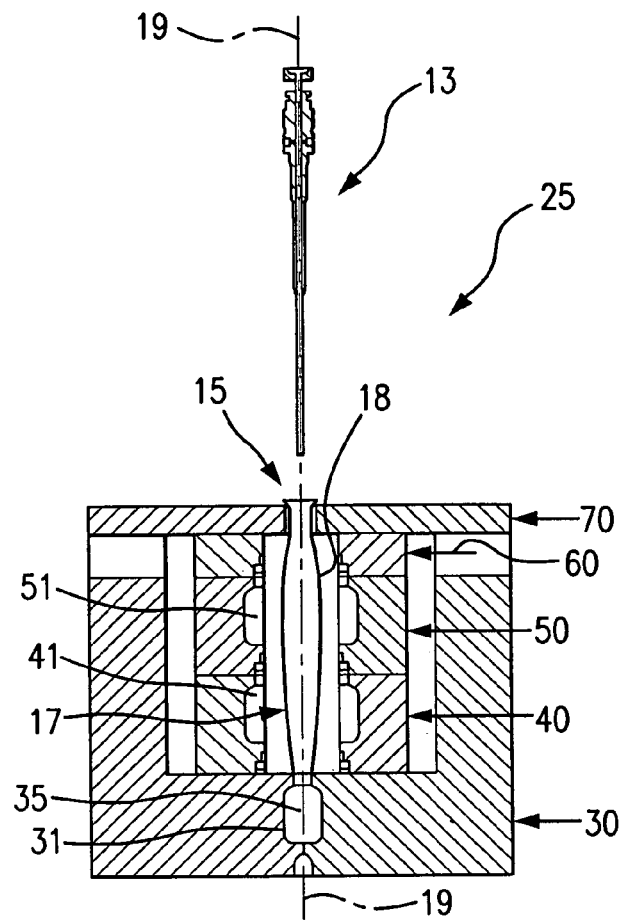
FIGS. 2-9 each shows a cross-sectional view of the steps to a method for molding and filling a plurality of tiered containers from a single parison, in a direction from start-to-finish, according to one embodiment of this invention.

FIGS. 2-9 show different cross-sectional views of corresponding mold halves of mold 27 at different method or process steps, in a direction from start-to-finish, according to one embodiment of this invention. FIG. 1 shows an initial step of a method according to different embodiments of this invention, where at least one parison 15 each is positioned or suspended between corresponding mold halves of mold 27. FIG. 2 shows a further step of the method, in which first section 30 of mold 27 moves into a closed position and first section 30 closes around or about first portion 16, such as shown in FIG. 1, of parison 15. First mover 32 can be used to operate mold halves of or to position first section 30 in a closed position around or about first portion 16 of parison 15. As first section 30 moves toward or closes about first portion 16 of parison 15, first section 30 forms first container 35. Depending upon the particular desired form/fill/seal result, first container 35 can be blow molded and/or vacuum formed. Any suitable design, shape and/or dimensions of corresponding mold halves and/or mold cavities can be used to form first container 35 and/or any other container of this invention.

First container 35, second container 45, third container 55 and/or any other container suitable for use with the methods according to this invention can be formed, filled and/or sealed, for example by a blowing step and/or a vacuum step and/or a filling step and/or a sealing step. In other embodiments according to this invention, any container can be only blow molded. In still other embodiments according to this invention, it is possible for the method to include a blow step and a fill step, without a seal step. In yet other embodiments according to this invention, the method includes a form step, by blow molding and/or vacuum forming, a fill step and a seal step.

In some embodiments of this invention, after each container is formed, mold 27 is moved to a fill and/or seal station and in other embodiments, the fill and/or seal station is moved to mold 27 and/or any one or more formed containers.

The drawings, specifications and claims of this invention describe a method and apparatus for molding a plurality of tiered or stacked containers. As used throughout this specification and in the claims, the terms tiered and stacked are intended to be interchangeable with each other and are intended to relate to two or more containers formed from one parison 15. FIGS. 1 and 2 each shows parison 15 having axis 19. As shown in FIG. 1, axis 19 is generally parallel to or aligned with an overall longitudinal direction or orientation of parison 15. In some embodiments according to this invention, two or more containers are formed from one parison 15 and are tiered or stacked, such as positioned adjacent or next to each other, in a direction along or generally parallel to axis 19, for example as shown by the three tiered or stacked containers 35, 45 and 55 in FIGS. 9 and 17.

Figure 17:
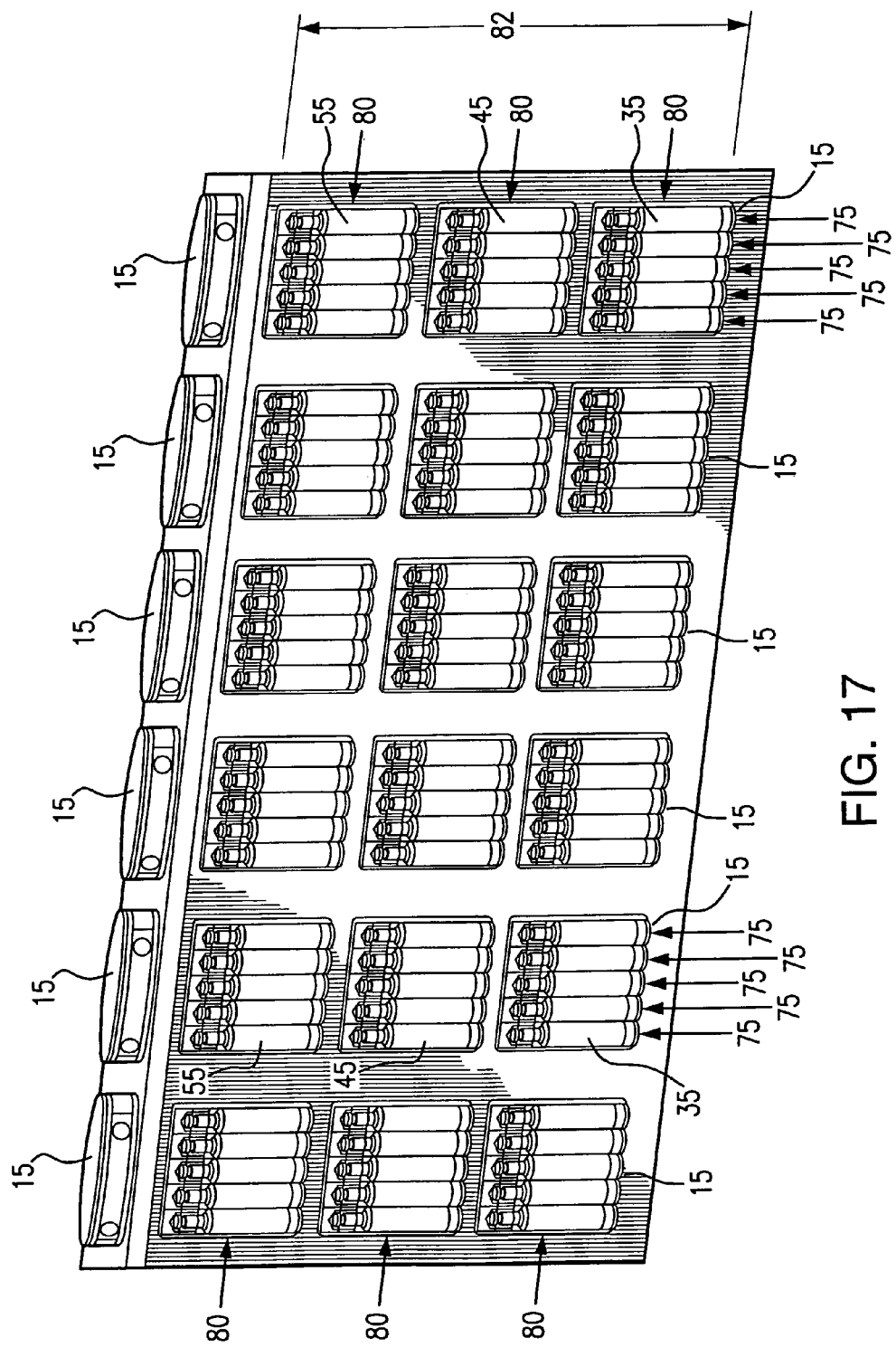
FIG. 17 shows a perspective view of an array or matrix of ninety total containers formed by six parisons each having fifteen containers formed by three rows and five columns of containers, according to one embodiment of this invention.

In some embodiments of this invention, as further described later in this specification, a plurality of or a series of parisons 15 can be arranged or positioned next to, adjacent to or otherwise with respect to each other, to form an array or a matrix of containers. For example, two or more parisons 15 can be positioned next to each other, such as shown by the double-headed arrows in FIG. 16 and as shown by the six parisons 15 in FIG. 17, and each parison 15 can be used to form two or more columns 75 of containers each having two or more rows 80 forming one tier 82 of containers. As shown in FIG. 17, each parison 15 has three rows 80, including a lower row 80, a middle row 80 and an upper row 80, that form tier 82. As shown in FIG. 17, each row 80 of each parison 15 has five formed containers. In other embodiments according to this invention, tier 82 can include only two rows 80 of containers or can contain four or more rows 80 of containers. Thus, in some embodiments according to this invention, one cycle of opening and closing mold 27 can be used to form a plurality of containers which can be arranged in any suitable array or matrix configuration.

As shown in FIG. 2, first section 30 is moved into a closed position while second section 40 and third section 50 remain in an opened position and moved away from parison 15. As shown between FIGS. 1 and 1A, it is possible for parison 15 to be cut off, severed or otherwise detached and then held in a desired position, such as by holder 70 which can be operated by mover 72. As shown in FIG. 2, first container 35 is formed but is empty, as indicated by no cross-hatching over first container 35. At the step shown in FIG. 2, in some embodiments of this invention, a nozzle or probe can be movably operated with respect to mold 27 and/or mold 27 can be movably operated with respect to the nozzle or probe, to flush or vent first container 35 with any suitable fluid and/or to empty an interior void of first container 35, as necessary.

Figure 3:
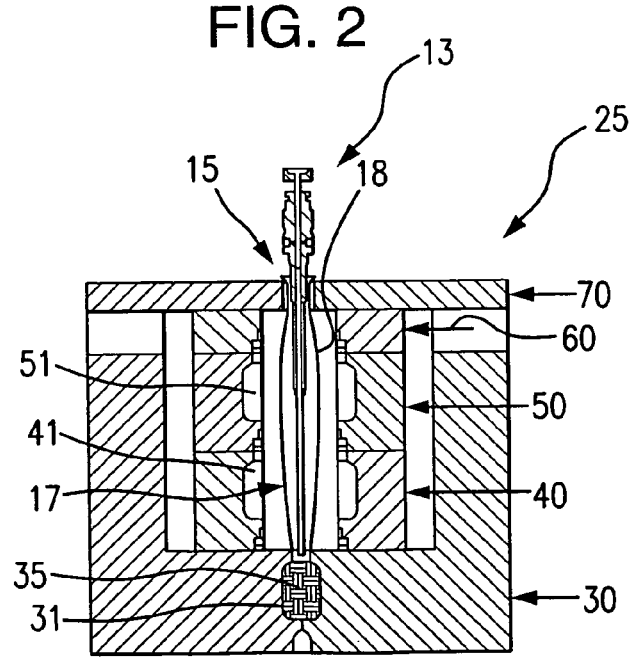

FIG. 3 shows a further step where filler 13 is removeably positioned within an interior of first container 35. Filler 13 can be in fluidic communication between the interior of first container 35 and a fluid supply. Fluidic communication can be formed by any suitable nozzle, filler or other device or method known to those skilled in the art of blow molding and/or vacuum forming and/or filling and/or sealing. In some embodiments according to this invention, a fluid source can exchange a media, including but not limited to any suitable fluid, fluidized particles and/or other suitable material, within a cavity of first container 35, which for example can result in removing a fluid or liquid or other media already within first container 35 and filling first container 35 with another suitable media.

After first container 35 is filled, if desired, filler 13 can be withdrawn, such as away from first container 35. As shown in FIG. 4, second section 40 of mold 27 forms cavity 41, such as shown in FIG. 1, that can accommodate or form second container 45. Second mover 42 can move or otherwise position second section 40 into a closed position around or about second portion 17 of parison 15. Second section 40 can be moved close enough together to mold or otherwise form second container 45, such as shown in FIG. 4. Filler 13 can be operated to flush and/or fill second container 45 with one or more suitable medias, such as fluids and/or materials.

As shown in FIG. 5, second container 45 is filled with a suitable media, which can be the same as or different from the media already within first container 35. As shown in FIG. 4, second section 40 has sealer 43 that can be moved to seal first container 35.

Figure 6:
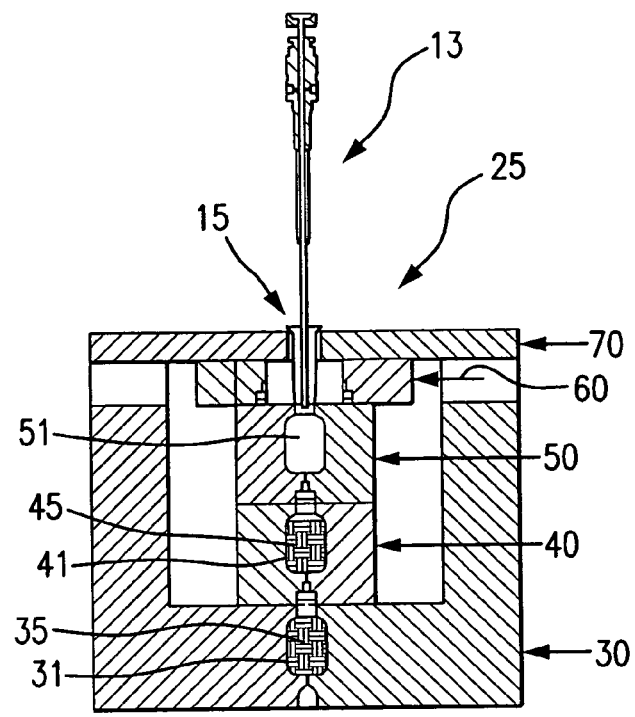

As shown in FIG. 6, third section 50 is operated or moved into a closed position around or about third portion 18 of parison 15. Third section 50 of mold 27 can be moved or closed far enough to form third container 55 about third portion 18 of parison 15. In some embodiments according to this invention, as shown in FIG. 6, sealer 53 of third section 50 can be moved to seal second container 45.

Filler 13 can be moved, controlled and/or operated, with respect to parison 15 and/or mold 27, to flush and/or fill the formed third container 55 with any suitable fluid or media. As shown by the cross-hatching in FIG. 7, third container 55 is filled with a suitable media or material, which can be the same as or different from either media or material within first container 35 and/or second container 45.

Figure 7:
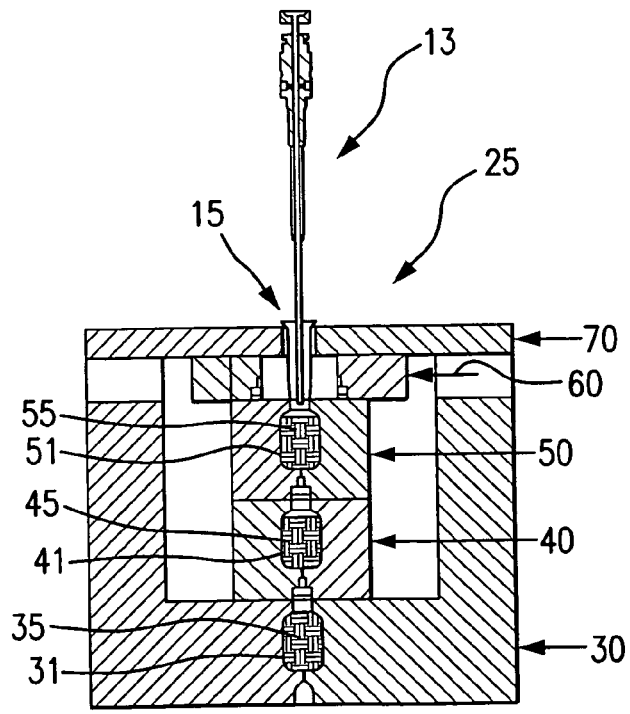
Figure 8:
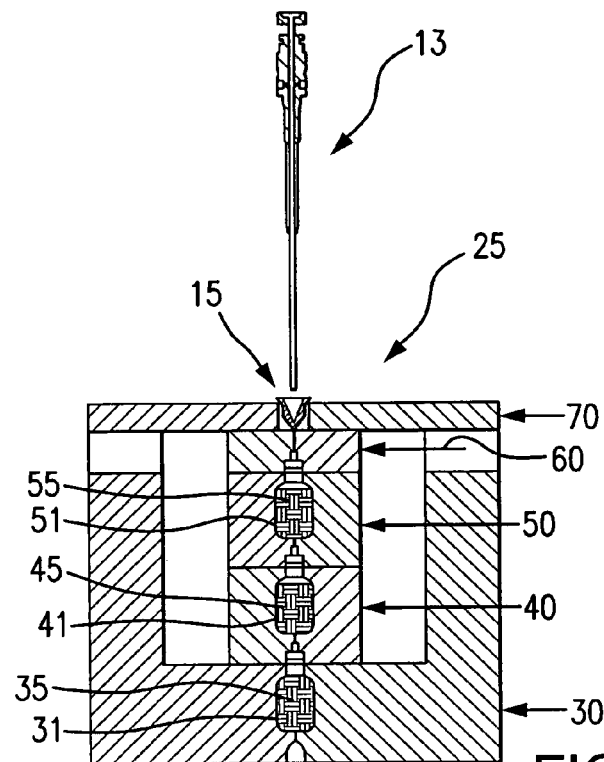
Figure 9:
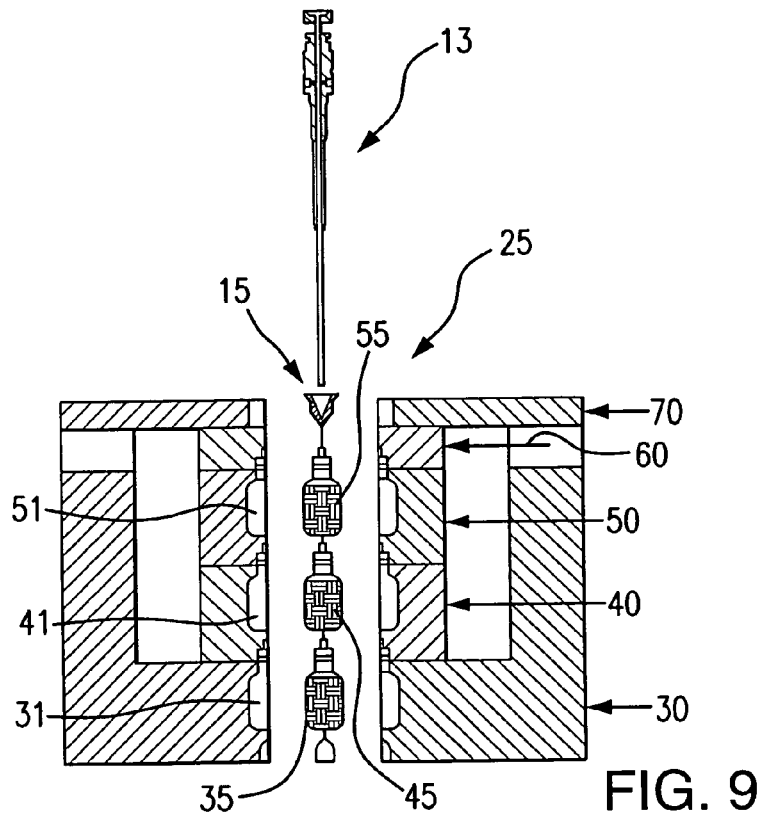
Figure 10:
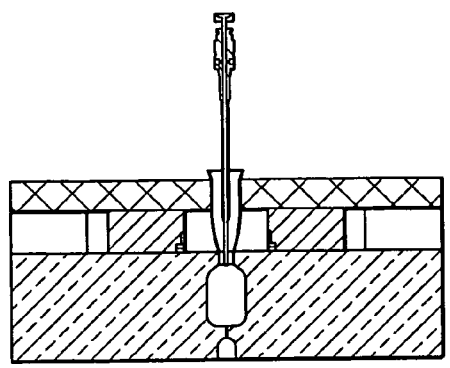
FIGS. 10-13 each shows a cross-sectional view of different method steps for molding one container from a parison, in a direction from start-to-finish, according to prior art.
Figure 11:
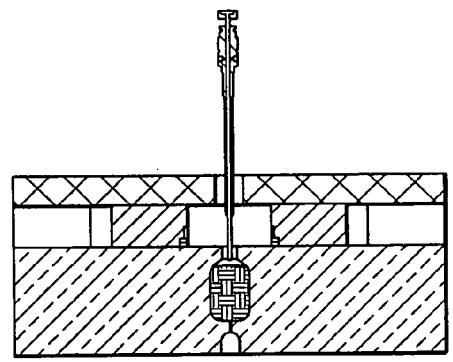
Figure 12:
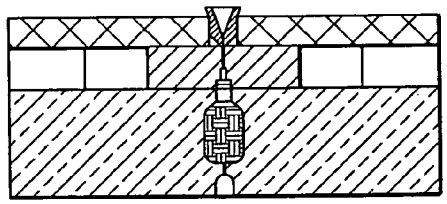
Figure 13:
Figure 13:
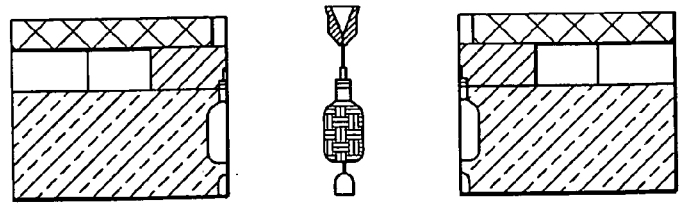

As shown in FIG. 7, sealer 63 of fourth section 60 of mold 27 can be moved to seal third container 55. As shown in FIG. 8, filler 13 is moved completely away from or out of third container 55. As shown in FIG. 9, first section 30, second section 40 and third section 50 each is moved away or released from parison 15 used to form first container 35, second container 45 and third container 55.

In some embodiments according to this invention, after a container is formed and/or filled, an article is inserted or positioned on, at or near the container. For example, in some embodiments of this invention, a tip and cap insert can be moved or positioned on, at or near a container that has been formed and filled but not yet sealed. In other embodiments according to this invention, another suitable article can be moved or positioned on, at or near, or otherwise with respect to, the already formed container so that the article becomes connected to, integrated with, detachably connected to and/or part of the body or other structure of the container.

Many conventional devices and/or methods for insertion molding are known to those skilled in the art of blow/fill/seal technology. For example, U.S. Pat. No. 4,699,748 teaches an insertion molding device and method for insertion molding a body of a container, an insert article positioned at an opening of the body, and a closure structure unitary with the body, wherein the closure structure encapsulates at least a portion of the insert article, to seal close the container. The entire teachings of U.S. Pat. No. 4,699,748 are incorporated into this specification by reference. Many other conventional devices are known that pick and place an insert article on, at or near the formed container, and can be combined with the apparatus and method features of this invention, to provide an apparatus and/or method for insertion molding an insert article on, at or near first container 35, second container 45, third container 55 and/or any other container formed according to this invention. For example, a closure structure such as taught by U.S. Pat. No. 4,699,748 or any other suitable cocoon structure or other structure can be formed by sealer 43, according to this invention, such as shown in FIGS. 1, 1A, 1B, 1C and/or 1D.

Each of movers 32, 42, 52, 62 and 72 is schematically shown as a double-headed arrow in the drawings. Any suitable controller and/or moving device or apparatus, such as a mechanical mover, a fluidic mover, an electrical mover, a magnetic mover, a pneumatic mover, or any other moving device known to those skilled in the art of blow/fill/seal technology, including but not limited to any one or more of the controllers, moving devices and/or other elements and/or steps disclosed in and taught by U.S. Pat. Nos. 6,381,926, 4,967,539, 7,396,225, 5,503,885 and/or 4,699,748, can be used to design, construct and/or operate mover 32, 42, 52, 62 and/or 72 and/or any other moving device of this invention.

As shown in FIGS. 1-9, each of movers 32, 42, 52, 62 and/or 72 are shown as moving in a direction which is generally perpendicular to axis 19 of parison 15. Because parison 15 may have a somewhat irregular shape, axis 19 may not be precisely defined but may be defined only in a general sense, and in such cases, any one or more of movers 32, 42, 52, 62 and/or 72 can move in a direction or along a path which is non-parallel to or not parallel to but which may not be exactly or even generally perpendicular to axis 19 and still result in movement of the corresponding mold halves to surround or be positioned about a corresponding mold section of parison 15. In some embodiments according to this invention, movers 32, 42, 52, 62 and/or 72 move in a direction which is generally parallel with respect to each other. However, in other embodiments according to this invention, mover 32, 42, 52, 62 and/or 72 may move in a direction not generally parallel to each other. In many embodiments according to this invention, a desired result is for the movement of mover 32, 42, 52, 62, and/or 72 to form at least two tiered or stacked containers in a generally longitudinal direction along parison 15 or generally parallel to axis 19.

In some embodiments according to this invention, two or more parisons 15, each of which has two or more columns 75 each with two or more rows 80 forming tier 82 of a plurality of containers, can be arranged in any adjacent or other suitable manner, such as known to those skilled in the art of form/fill/seal technology, to form an array or a matrix of containers. For example, twelve different parisons 15 can be positioned adjacent or next to each other and each parison 15 can form three rows 80 of tiered containers, such as shown in FIGS. 2-9. First section 30, second section 40, third section 50 and/or any other element of molding apparatus 25 can be designed, arranged and/or configured in a suitable manner for consecutively and/or simultaneously operating through a closing and opening cycle. With twelve parisons 15 and each parison 15 forming three tiered or stacked containers, one molding cycle would result in an array or matrix of thirty-six containers. As another example, twenty parisons 15 can be positioned next to each other, with each parison 15 forming ten tiered or stacked containers, to form an array of two hundred containers. Any other suitable number of parisons and/or containers can be used to form any desired array or matrix of containers. In some arrays according to this invention, it is not necessary to have the same number of containers formed by each parison 15 and/or to have the same number of containers in each column 75 and/or row 80 of an array.

As used throughout this specification and in the claims, the terms array and matrix are intended to be interchangeable with each other and are also intended to relate to an arrangement of a plurality of containers made according to this invention, which are arranged in columns 75 and rows 80. For example, FIGS. 16 and 17 each shows an array of six parisons 15 each forming fifteen containers, for an overall array of ninety containers. As shown in FIGS. 16 and 17, each parison 15 corresponds to five columns 75 of containers, wherein each column 75 has one first container 35 in a first row 80, one second container 45 in a second row 80 and one third container 55 in a third row 80, tiered or formed in a tiered arrangement of tier 82. As shown in FIGS. 16 and 17, first container 35 is formed in the lowermost row 80, second container 45 is formed in the middle row 80 and third container 55 is formed in the uppermost row 80.

In some embodiments according to this invention, the array of one or more columns 75 by rows 80 has all containers sized the same. In other embodiments according to this invention, the array can have differently sized containers. For example, an array can be similar to the array shown in FIG. 16, with the first three columns 75, from right-to-left having the same sized containers, but the two right-most columns 75 having differently sized containers, with one column 75 having one container and the other column 75 having two differently sized containers. Any array according to this invention can have two or more containers.

According to this invention, it is possible to operate filler 13 so that different or the same media and/or materials flow to and fill different containers within each column 75 and/or row 80. It is also possible to fill all containers of an array of one parison 15 with one media and all containers of an array of another parison 15 with a different media.

The particular filler devices, flushing devices, flowing devices, vacuuming devices, mechanical movers and other components of molding apparatus 25 of this invention can be designed, assembled and/or produced, for example to move in any desired manner suitable for the method steps and/or the apparatus elements of this invention, using conventional elements and/or steps that are known to those skilled in the art of form/fill/seal technology.

The particular designs, shapes, dimensions and/or materials of different elements of this invention are not essential to this invention and can be furnished or supplied by those elements as known to persons skilled in the art of blow molding.

As described throughout this specification, as shown in the drawings, and as described in the claims, molding apparatus 25 and any corresponding container is described, for example according to the embodiments shown in FIGS. 2-9 and 16-18, which in the drawings are shown in an upright position. Any element and/or method step of this invention can operate in a different direction and/or orientation and still accomplish the same result of forming one or more tiered containers as described in the method and apparatus according to this invention.

Any container according to this invention can be made from a thermoplastic or polymer material, such as polyethylene, polypropylene and/or any other suitable material known to those skilled in the art of blow molding and/or vacuum forming, filling and/or sealing.

Figures 14, 15:
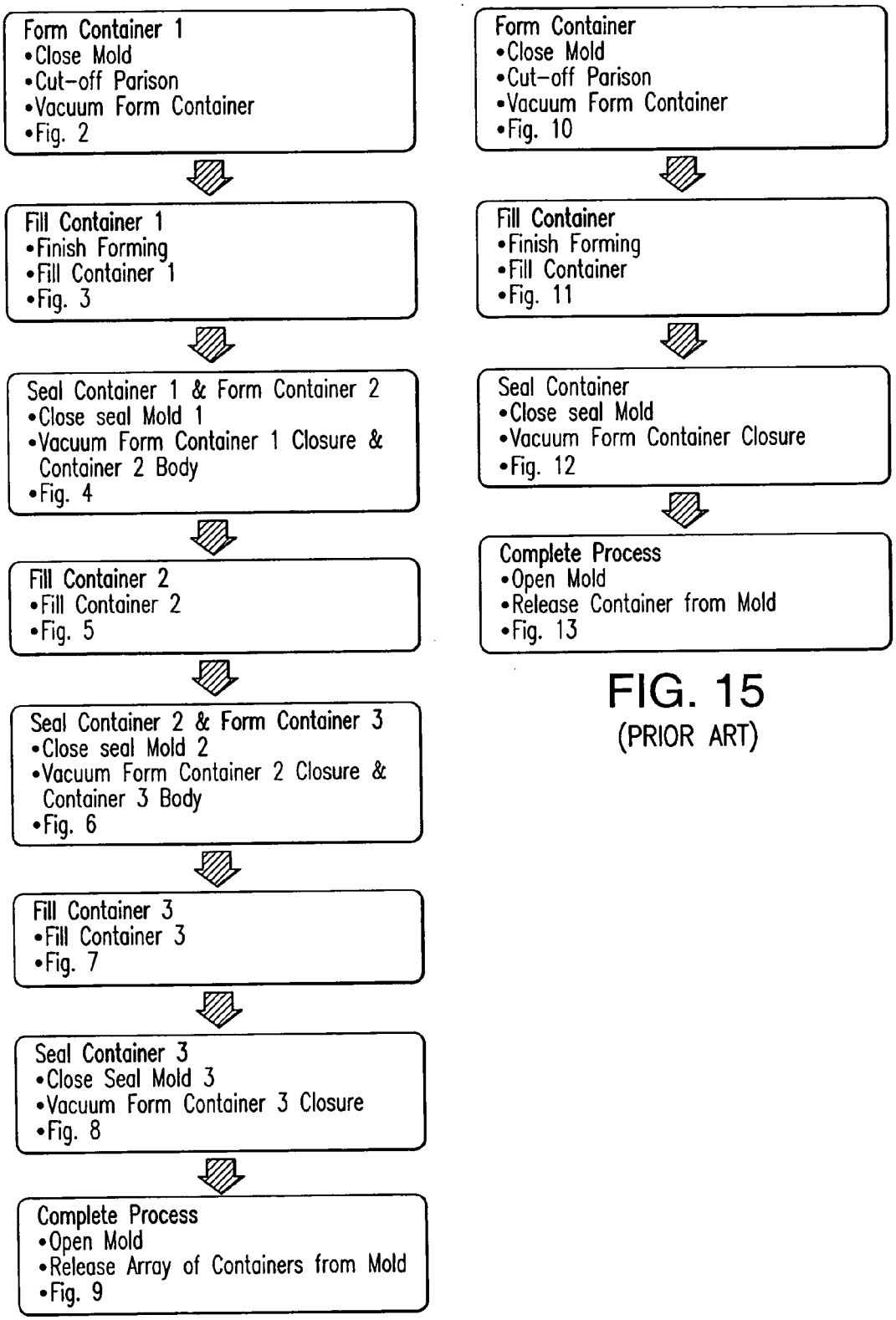
FIG. 14 shows a flow diagram of different method steps, in a direction from start-to-finish, for molding a plurality of tiered containers from a single parison, according to one embodiment of this invention.
FIG. 15 shows a flow diagram for method steps for molding a single container from a single parison, according to prior art.

FIGS. 2-9 show one embodiment of forming tiered containers according to this invention. FIG. 14 shows a process flow diagram with the method steps that correspond to FIGS. 2-9.

FIG. 15 shows a process flow diagram with the method steps that correspond to FIGS. 10-13, all according to known technology.

While in the foregoing specification this invention has been described in relation to certain preferred embodiments thereof, and many details have been set forth for purpose of illustration, it will be apparent to those skilled in the art that certain of the details described herein can be varied considerably without departing from the basic principles of this invention.

What is claimed is:

1. A method for molding a plurality of containers from a parison, the method including the steps of:
    moving a holder and holding the parison;
    cutting the held parison before filling or sealing the containers;
    moving a first section of a mold into a first closed position about a first portion of the parison;
    forming a plurality of at least a portion of first containers with the first portion of the parison in the first section;
    filling or sealing the first containers;
    simultaneously moving a second section of the mold which is integrated with the first section into a second closed position about a second portion of the parison; and
    forming a plurality of at least a portion of second containers, tiered with respect to the first containers, with the second portion of the parison in the second section.

2. The method of claim 1, wherein the first containers are filled with a first media before the second section is moved into the second closed position.

3. The method of claim 1, wherein moving the second section seals the first containers.

4. The method of claim 1, wherein a vacuum source and/or a blowing source forms the first containers in the first section of the mold and forms the second containers in the second section of the mold.

5. The method of claim 1, wherein the second section is moved into the second closed position after the first section is moved into the first closed position.

6. The method of claim 1, further including the steps of moving a third section of the mold into a third closed position about a third portion of the parison, and forming a plurality of third containers, tiered with respect to the second containers, with the third portion of the parison in the third section.

7. The method of claim 6, wherein the first containers are filled with a media before the second section is moved into the second closed position, and the second containers are filled with the media before the third section is moved into the third closed position.

8. The method of claim 6, wherein moving the third section seals the second containers.

9. The method of claim 6, wherein a vacuum source and/or a blowing source forms the third containers in the third section of the mold.

10. The method of claim 1, wherein the first containers and the second containers are tiered along an axis of the parison.

11. The method according to claim 6, further including the step of moving a fourth section of the mold into a fourth closed position to seal the third containers.

12. The method of claim 11, wherein the third containers are filled with a media before the fourth section is moved into the fourth closed position.

13. The method of claim 1, wherein the first section and the second section are moved in a direction generally perpendicular to an axis of the parison.

14. The method of claim 1, wherein the first section and the second section are moved in a direction that is non-parallel to an axis of the parison.

15. The method of claim 1, wherein the first containers and the second containers form an array of containers.

16. A method for molding a plurality of containers, the method including the steps of:
    moving a holder and holding a plurality of parisons;
    cutting the held parisons before filling or sealing the containers;
    moving a first section of a mold into a first closed position about a first portion of each of the parisons;
    forming at least a portion of a first container with the first portion of each said parison in the first section;
    filling or sealing the first containers;
    simultaneously moving a second section of the mold which is integrated with the first section into a second closed position about a second portion of each of the parisons; and
    forming at least a portion of a second container, tiered with respect to the first container, with the second portion of each said parison in the second section.

17. The method of claim 16, further including the steps of moving a third section of the mold into a third closed position about a third portion of each said parison, and forming a third container, tiered with respect to the second container, with the third portion of each said parison in the third section.

18. A method for molding a plurality of containers, the method including the steps of:
    moving a holder and holding a plurality of parisons;
    cutting the held parisons before filling or sealing the containers;
    moving a first section of a mold into a first closed position about a first portion of each of the parisons;

forming a plurality of at least a portion of first containers with the first portion of each said parison in the first section;

filling or sealing the first containers;

simultaneously moving a second section of the mold which is integrated with the first section into a second closed position about a second portion of each of the parisons; and forming a plurality of at least a portion of second containers, tiered with respect to the first containers, with the second portion of each said parison in the second section.

19. The method of claim 18, further including the steps of moving a third section of the mold into a third closed position about a third portion of each said parison, and forming a plurality of third containers, tiered with respect to the second containers, with the third portion of each said parison in the third section.

20. The method of claim 1, wherein the parison is cut and detached at or below a head used to extrude the parison.

21. The method of claim 1, wherein the cut parison forms an opening that accepts a nozzle for forming, filling and/or sealing at least one of the containers.

22. The method of claim 16, wherein each of the parisons is cut and detached at or below a head used to extrude the corresponding parison.

23. The method of claim 16, wherein each of the cut parisons forms an opening that accepts a nozzle for forming, filling and/or sealing at least one of the containers.

24. The method of claim 18, wherein each of the parisons is cut and detached at or below a head used to extrude the corresponding parison.

25. The method of claim 18, wherein each of the cut parisons forms an opening that accepts a nozzle for forming, filling and/or sealing at least one of the containers.

* * * * *